(No Model.) 2 Sheets—Sheet 2.

E. A. BLANTON, Jr.
SHAFT FOR STAMP MILLS.

No. 581,476. Patented Apr. 27, 1897.

UNITED STATES PATENT OFFICE.

EDWARD ANDERSON BLANTON, JR., OF WALLINGFORD, PENNSYLVANIA.

SHAFT FOR STAMP-MILLS.

SPECIFICATION forming part of Letters Patent No. 581,476, dated April 27, 1897.

Application filed January 13, 1897. Serial No. 619,098. (No model.)

*To all whom it may concern:*

Be it known that I, EDWARD ANDERSON BLANTON, Jr., a citizen of the United States, residing at Wallingford, Delaware county, State of Pennsylvania, have invented certain new and useful Improvements in Shafts for Stamp-Mills, of which the following is a specification.

My invention relates to means for securing cams and similar devices upon shafts, and while it may be used for many and various purposes it is more especially adapted for securing the cams of stamp-mills upon the shafts of such mills.

The object of my invention is to provide an improved means by which the cams may be securely held in position when adjusted and may be quickly released and replaced when worn out or for any other reason.

A further object is to provide a shaft by which the cams can be readily arranged in any desired order or relation to each other.

To these ends my invention consists in the various features of construction and arrangement substantially as hereinafter more particularly pointed out.

Figure 1:
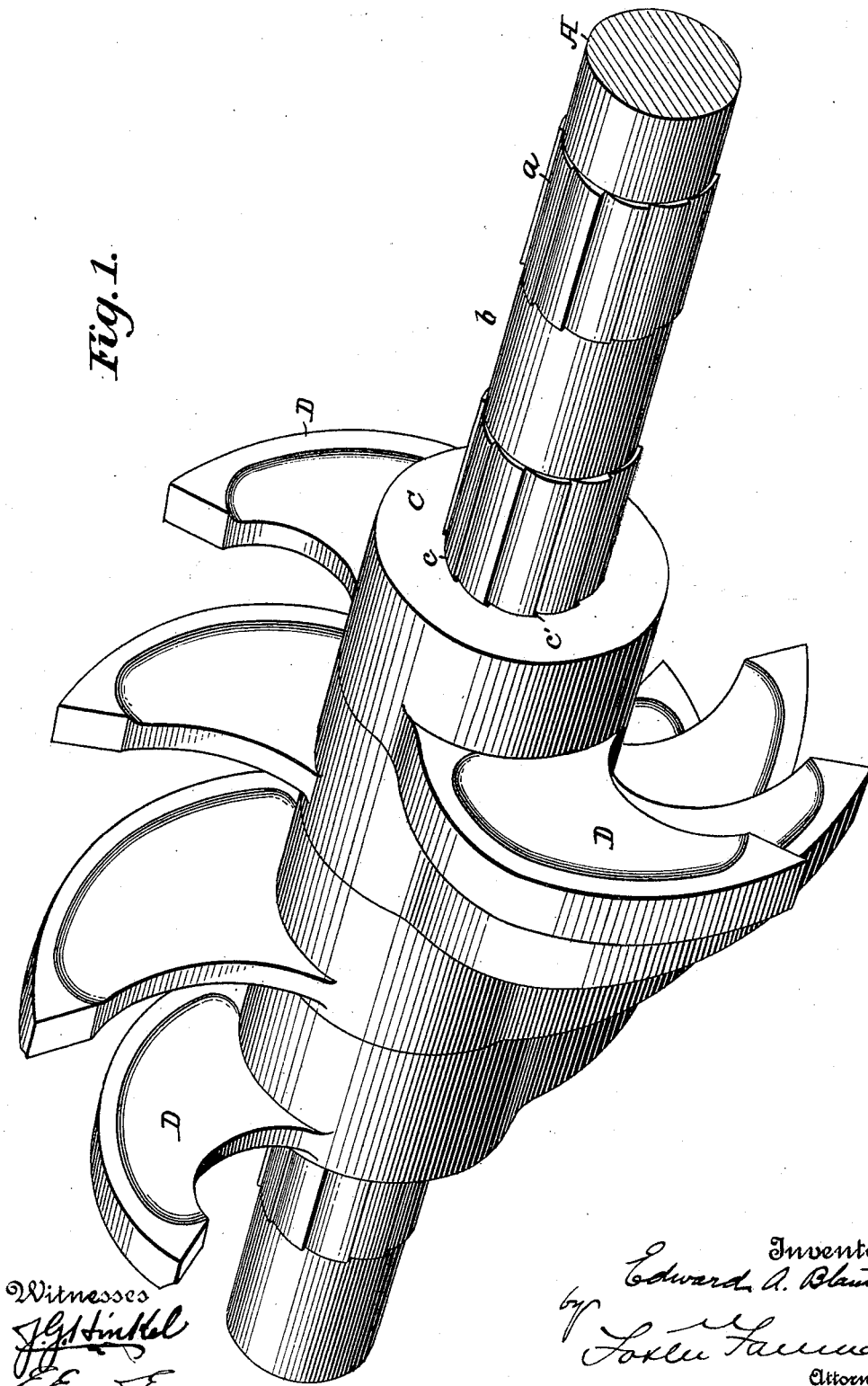
Figure 2:
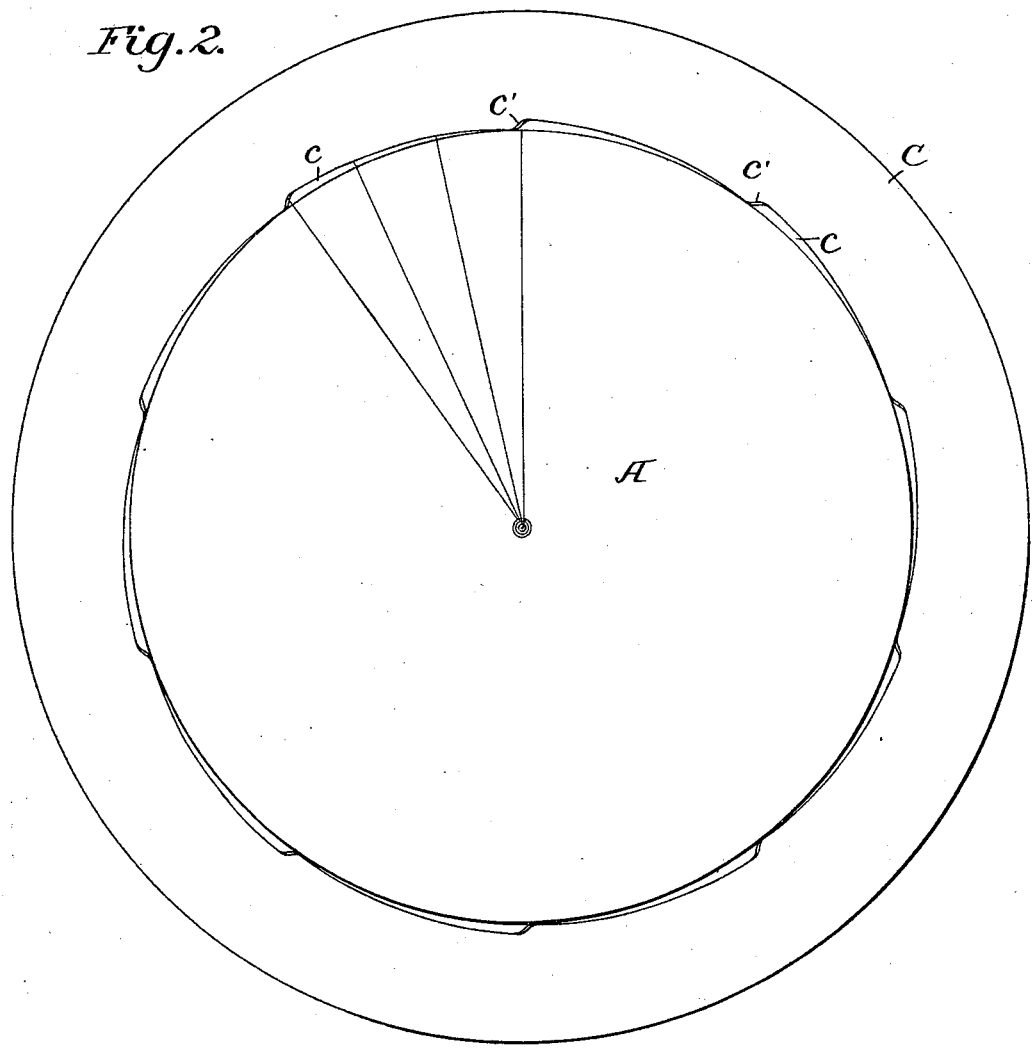

In the accompanying drawings, Figure 1 is a perspective view of a shaft embodying my invention with several cams mounted thereon. Fig. 2 is an enlarged end view of a shaft and hub mounted thereon, the cams being omitted for the sake of clearness, showing one way of forming the bosses or wedge-shaped portions of the shaft; and Fig. 3 is a similar view showing another form of bosses or wedges.

In carrying out the invention the shaft A is provided with a number of bosses or wedge-shaped portions $a$, extending longitudinally along the shaft and formed integrally with the shaft, and these may be formed in any desired mechanical way. In the drawings I have shown ten wedges or bosses arranged around the circumference of the shaft at equal distances apart, and this of course is simply illustrative, any number of bosses or wedges being supplied, according to the requirements of any particular case. These bosses or wedges may be continuous on the longitudinal surface of the shaft, or they may be separated by plain spaces, as shown at $b$, Fig. 1.

Arranged to be mounted on the shaft are the hubs C, there being one or more, according to the purpose for which the shaft is intended, and in the present instance I have shown these hubs as provided with projecting cams D, such as are commonly used in stamp-mills. These hubs C are provided with a number of recesses $c$ corresponding with the number of bosses or wedges on the shaft, the recesses, however, being a little longer on their curved surfaces than the outer surface of the bosses or wedges, leaving a space $c'$ between the thickened portion of the boss or wedge and the radial portion of the recess.

Figure 3:
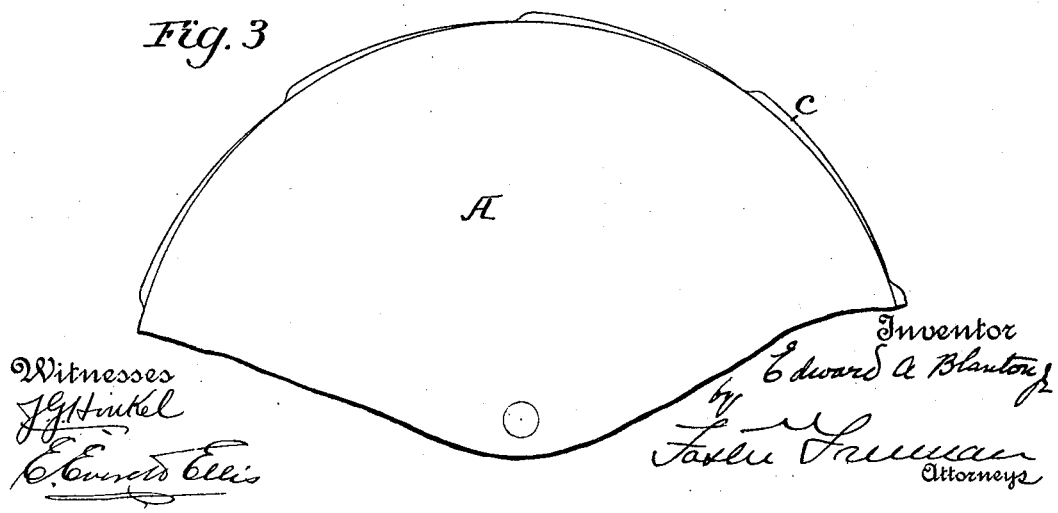

The outer surfaces of the bosses $a$ are on curves having gradually-increasing radii measured from the center of the shaft, and these bosses may be made on an eccentric, as shown in Fig. 3—that is, the outer surface of the wedge is made to conform to a curve the center of which is eccentric to the center of the shaft, so that the radii of the curve, taking the center of the shaft as a basic point, gradually increase—or, as shown in Fig. 2, the outer face of the bosses may conform to an involute curve—that is, a curve of such a form that the difference between the distances of any two points of the curve from a circle measured on tangents to the circle will be equal to the length of arc between the points at which said tangents touch the circle. In either case, however, the outer surfaces of the bosses on the shaft may be described as having gradually-increasing radii. This is indicated in Fig. 2 by the concentric circles and radial lines extending therefrom, which lines are of uniform length, but start at different distances from the center of the shaft.

The recesses $c$ in the hub or hubs of course are fashioned to correspond with the particular curve or eccentricity of the bosses on the shaft to which they are to be applied and are made to correspond to the outlines of the outer surfaces of the bosses.

I have shown the bosses or wedges as extending completely around the circumference of the shaft, and that I consider is the preferable form, although the objects of my invention can be accomplished to a greater or less extent by having the bosses extend partially around the circumference, leaving, for instance, plain spaces between the lowest part of one boss and the highest part of the next succeeding boss. There being a number of bosses on the shaft, (ten in the present instance,) it is unnecessary to make them of any great thickness, even at their thickest part, as I am enabled to divide the thickness of the wedge or boss, which would be mechanically sufficient if a single one were used, into as many parts as there are bosses or wedges on the shaft. So in the present instance there being ten bosses or wedges, the thickest portion of each wedge is practically one-tenth of what would ordinarily be required if a single wedge or boss were used.

To illustrate further, suppose the shaft to be six inches in diameter, and if used with a single wedge or boss the thickest portion of the wedge might be three-fourths of an inch, but by dividing this wedge into ten separate wedges I make each of them one-tenth as thick as the single boss would be. This feature is of great importance in the manufacture of the shaft, enabling it to be readily made by machinery and in no way weakens the hold between the hub and shaft or the accuracy of the adjustment of the hub thereon. Further, when the wedges or bosses extend practically throughout the circumference of the shaft, as indicated, there is an even bearing and relative strain on practically all portions of the hub. In actual practice I find it is desirable that the outermost portion of the thick end of the wedge or boss be curved slightly, as this conduces to its ready manufacture and in no way interferes with its efficiency.

It will be seen that the hub or hubs may be slipped over the shaft to the desired position thereon, and then by slightly turning the hub it can be secured tightly on the shaft by the outer surfaces of the bosses bearing closely against the inner surfaces of the recesses in the hub, and it will there remain securely fastened to the shaft and can be loosened therefrom by slightly turning it in the opposite direction, the spaces $c'$ in the recesses permitting sufficient motion to produce a clearance between the outer surfaces of the bosses and the inner surfaces of the recesses.

In the case of a cam-shaft for stamp-mills, such as illustrated in Fig. 1, it will be seen that the hubs can be arranged close together or at any desired distance apart, and, moreover, they can be arranged in any relation, so that the tips of the cams D will occupy a certain definite and desired relation to each other, and this order or relation can be changed at pleasure. In some instances it is desirable to have spaces $b$ between the bosses on the shaft, and these spaces are preferably wide enough to permit the hub C turning thereon, so that when it is desired to adjust a hub it need not be removed entirely from the shaft, but after being loosened from the bosses can be slid longitudinally until it comes into the plain space $b$ and turned around to the desired position and replaced upon the shaft.

This construction is especially desirable in stamp-mills, where it is necessary that the cams shall hold the position in which they are adjusted with relation to each other in order to insure the proper operation of the stamps. It will further be seen that no screws, wedges, or other detachable parts are necessary in order to properly adjust the hub or hubs on the shaft.

What I claim is—

1. A shaft having a series of curved integral wedge-shaped bosses arranged in a circumferential line around the shaft, in combination with a hub having a series of recesses to engage the bosses, said hub being adapted to be tightened by turning on said bosses, substantially as described.

2. A shaft having a series of curved integral wedge-shaped bosses extending longitudinally of and in a circumferential line around the shaft, in combination with a series of hubs each having a series of recesses corresponding to the bosses, said hubs being adapted to be tightened by turning them on said bosses, substantially as described.

3. A shaft having a series of curved integral bosses arranged around its circumference and extending longitudinally of the shaft and having plain surfaces interposed between the extremities of the bosses, in combination with a series of hubs having recesses corresponding to the bosses, and adapted to be tightened thereon, substantially as described.

4. A shaft having a series of eccentric curved wedge-shaped bosses, in combination with a hub having a series of recesses the surfaces of which correspond to the external surfaces of the bosses, said hub being adapted to be tightened by turning on said bosses, substantially as described.

In testimony whereof I have signed my name to this specification in the presence of two subscribing witnesses.

EDWARD ANDERSON BLANTON, JR.

Witnesses:
ROBERT L. MORGAN,
R. A. KIRKPATRICK.